US008661271B2

(12) United States Patent
Tan et al.

(10) Patent No.: US 8,661,271 B2
(45) Date of Patent: Feb. 25, 2014

(54) APPARATUS AND METHOD TO CONTROL THE STATE OF A POWER SUPPLY WHEN A TRIGGER SIGNAL IS RECEIVED DURING A PREDETERMINED TIME PERIOD

(75) Inventors: Bi-Hui Tan, Shenzhen (CN); Li-Wen Guo, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 222 days.

(21) Appl. No.: 13/186,738

(22) Filed: Jul. 20, 2011

(65) Prior Publication Data
US 2012/0166821 A1    Jun. 28, 2012

(30) Foreign Application Priority Data

Dec. 24, 2010 (CN) .......................... 2010 1 0604177

(51) Int. Cl.
*G06F 1/00* (2006.01)
*G06F 9/00* (2006.01)
*G06F 15/177* (2006.01)

(52) U.S. Cl.
USPC ............................................ 713/300; 713/2

(58) Field of Classification Search
USPC .......................................................... 713/300
See application file for complete search history.

(56) References Cited

U.S. PATENT DOCUMENTS

| 6,453,423 B1 * | 9/2002 | Loison ........................... 713/310 |
| 7,240,222 B1 * | 7/2007 | Falik et al. ..................... 713/300 |
| 2007/0050648 A1 * | 3/2007 | Zaman et al. .................. 713/300 |

* cited by examiner

*Primary Examiner* — Thomas Lee
*Assistant Examiner* — Robert Cassity
(74) *Attorney, Agent, or Firm* — Altis Law Group, Inc.

(57) ABSTRACT

A start-up control apparatus includes a switch, an advanced configuration and power interface (ACPI) controller, a power supply, and a control chip. The switch creates a trigger signal. The trigger signal includes a first falling-edge and a first rising-edge. The control chip includes a control module and a monitoring module. The monitoring module sends a status signal about the power supply to the control module. The control module receives the first falling-edge and sends a second falling-edge to the ACPI controller according to the status signal after receiving the status signal. The ACPI controller sends a control signal to the power supply to enable the power supply to change from a first status to a second status. The control module sends a second rising-edge to the ACPI controller before receiving the first rising-edge when the power supply is in the second status.

10 Claims, 2 Drawing Sheets

APPARATUS AND METHOD TO CONTROL THE STATE OF A POWER SUPPLY WHEN A TRIGGER SIGNAL IS RECEIVED DURING A PREDETERMINED TIME PERIOD

BACKGROUND

1. Technical Field

The present disclosure relates to start-up control apparatuses and methods.

2. Description of Related Art

A computer usually has a button located in the front panel of the computer. A trigger signal is created by pressing the button. An advanced configuration and power interface (ACPI) controller controls power supply to power on the computer according to the trigger signal. A time period between a falling-edge and a rising-edge of the trigger signal is long when the pressed time of the button is long. The ACPI controller may control the power supply to power on the computer and power off the computer when the button is pressed.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
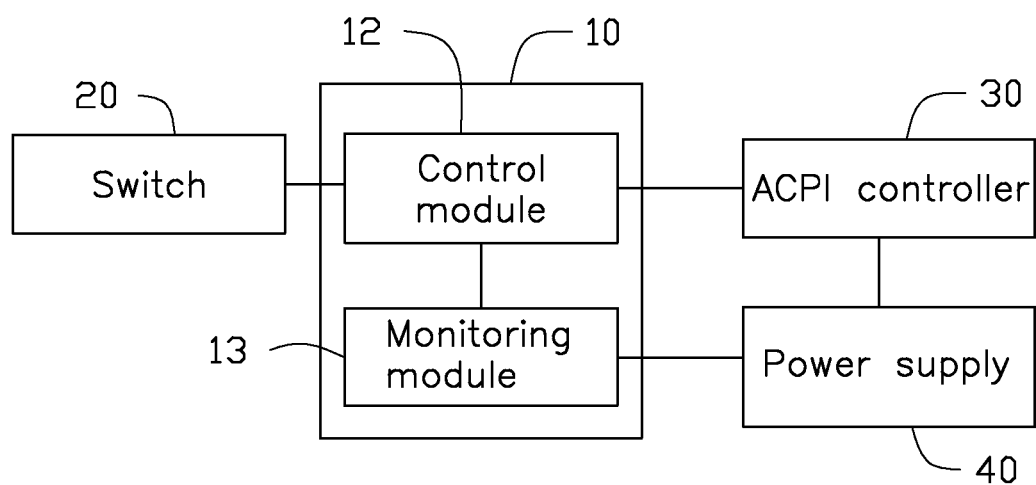
FIG. 1 is a schematic view of a start-up control apparatus in accordance with an embodiment.

Referring to FIG. 1, a start-up control apparatus, applied in a computer system, includes a control chip 10, a switch 20, an ACPI controller 30, and a power supply 40. In one embodiment, the computer system is a server. In one embodiment, the control chip is a programmable logic device.

The control chip 10 includes a control module 12 and a monitoring module 13. The switch 20 is connected to the control module 12. The control module 12 is connected to the ACPI controller 30. The monitoring module 13 is connected to the control module 12 and the power supply 40. In one embodiment, the ACPI controller 30 is located in a south bridge chip.

A power source of the server, for example, a battery, provides power to the control chip 10 and the ACPI controller 30.

The switch 20 creates a trigger signal. The trigger signal includes a falling-edge and a rising-edge. The falling-edge is created when the switch is pressed down and the rising-edge is created when the switch rebounds. The monitoring module 13 monitors the status of the power supply 40 and sends the status to the control module 12. The control module 12 sends a control signal to the ACPI controller according to the status of the power supply 40. The ACPI controller 30 controls the power supply 40 to power on or off the computer system according to the control signal.

Figure 2:
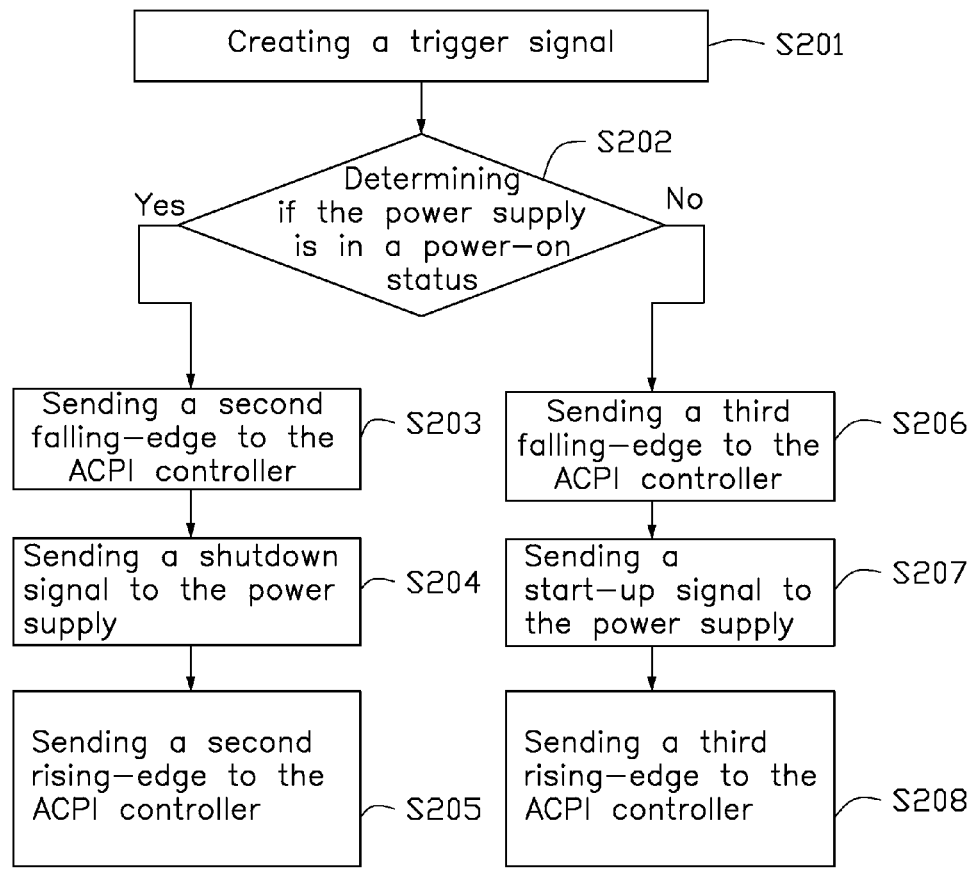
FIG. 2 is a flow chart of a start-up control method in accordance with an embodiment.

Referring to FIG. 1 and to FIG. 2 which shows a start-up method. An embodiment of the method is as follows.

In step S201, the switch 20 is pressed to create a first falling-edge of a trigger signal.

In step S202, the control module 12 determines if the power supply 40 is in a power-on status. If so, the control module 12 determines the first falling-edge is used for powering on and the process continues to step S203. If not, the control module 12 determines the first falling-edge is used for powering off, and the process continues to step S206.

In step S203, the control module 12 sends a second falling-edge to the ACPI controller 30 corresponding to the first falling-edge.

In step S204, the ACPI controller 30 sends a shutdown signal to the power supply 40.

In step S205, before the switch 20 creates a first rising-edge the control module 12 sends a second rising-edge to the ACPI controller 30 when the power supply 40 is in a power-off status.

In step S206, the control module 12 sends a third falling-edge to the ACPI controller corresponding to the first falling-edge.

In step S207, the ACPI controller 30 sends a start-up signal to the power supply 40.

In step S208, before the switch 20 creates a first rising-edge the control module 12 sends a third rising-edge to the ACPI controller 30 when the power supply 40 is in a power-on status.

There is a short time between the first falling-edge and the second or third rising-edge, in which the computer system can avoid being powered on and then powered off.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A start-up control apparatus, comprising:
a switch, the switch creating a trigger signal, the trigger signal comprising a first falling-edge and a first rising-edge;
an advanced configuration and power interface (ACPI) controller;
a power supply; and
a control chip, the control chip comprising a control module and a monitoring module, the monitoring module adapted to send a status signal about the power supply to the control module, the control module adapted to send a second falling-edge corresponding to the first falling-edge to the ACPI controller after receiving the status signal;
wherein the ACPI controller is adapted to send a control signal corresponding to the second falling-edge to trigger the power supply to change from a first status to a second status; and the control module is further adapted to send a second rising-edge to the ACPI controller before receiving the first rising-edge when the power supply is in the second status.

2. The start-up control apparatus of claim 1, wherein the first status is a power-off status and the second status is a power-on status.

3. The start-up control apparatus of claim 1, wherein the first status is a power-on status and the second status is a power-off status.

4. The start-up control apparatus of claim 1, wherein the ACPI controller is located in a south bridge chip.

5. The start-up control apparatus of claim 1, wherein the control chip is a programmable logic device.

6. A start-up control method, comprising:
 providing a switch, an advanced configuration and power interface (ACPI) controller, a power supply, and a control chip;
 creating a trigger signal by the switch, the trigger signal comprising a first falling-edge and a first rising-edge;
 receiving a status signal of the power supply by the control chip;
 sending a second falling-edge corresponding to the first falling-edge by the control chip to the ACPI controller according to the status signal;
 sending a control signal corresponding to the second falling-edge by the ACPI controller to the power supply to trigger the power supply to change from a first status to a second status; and
 sending a second rising-edge to the ACPI controller before receiving the first rising-edge by the control chip when the power supply is in the second status.

7. The start-up control method of claim 6, wherein the first status is a power-off status and the second status is a power-on status.

8. The start-up control method of claim 7, wherein the first status is a power-on status and the second status is a power-off status.

9. The start-up control method of claim 6, wherein the ACPI controller is located in a south bridge chip.

10. The start-up control method of claim 6, wherein the control chip is a programmable logic device.

* * * * *